US012795292B1

(12) United States Patent
Madison et al.

(10) Patent No.: US 12,795,292 B1
(45) Date of Patent: Nov. 10, 2026

(54) TUNABLE PASSIVE RADIATOR LOW FREQUENCY ABSORBER AND METHOD OF USE

(71) Applicant: RPG ACCOUSTICAL SYSTEMS LLC, Passaic, NJ (US)

(72) Inventors: Jeffrey S. Madison, Newtown, PA (US); Peter D'Antonio, Chester, MD (US); Rinaldi P. Petrolli, Rio Grande Do Sul (BR)

(73) Assignee: RPG ACOUSTICAL SYSTEMS LLC, Passaic, NJ (US)

( * ) Notice: Subject to any disclaimer, the term of this patent is extended or adjusted under 35 U.S.C. 154(b) by 0 days.

(21) Appl. No.: 19/539,376

(22) Filed: Feb. 13, 2026

(51) Int. Cl.

| | |
|---|---|
| ***H04R 1/28*** | (2006.01) |
| ***H04R 1/02*** | (2006.01) |
| ***H04R 1/24*** | (2006.01) |
| ***H04R 9/06*** | (2006.01) |

(52) U.S. Cl.
CPC ........... *H04R 1/2834* (2013.01); *H04R 1/025* (2013.01); *H04R 1/24* (2013.01); *H04R 9/06* (2013.01)

(58) Field of Classification Search
CPC ........ H04R 1/2834; H04R 1/025; H04R 1/24; H04R 9/06
See application file for complete search history.

(56) References Cited

U.S. PATENT DOCUMENTS

| | | | | |
|---|---|---|---|---|
| 2,153,357 | A * | 4/1939 | Wente | G10K 11/16 181/291 |
| 2,541,159 | A * | 2/1951 | Geiger | E04B 1/84 181/208 |
| 5,035,298 | A * | 7/1991 | Noxon | E04F 13/0867 181/295 |
| 5,629,503 | A * | 5/1997 | Thomasen | F16F 7/108 181/207 |
| 5,975,238 | A * | 11/1999 | Fuchs | E04B 1/99 181/290 |
| 6,173,806 | B1 * | 1/2001 | Ito | E01F 8/0094 181/295 |
| 8,616,330 | B1 * | 12/2013 | McKnight | B60R 13/08 181/207 |
| 8,857,563 | B1 * | 10/2014 | Chang | G10K 11/172 181/286 |
| 9,145,675 | B2 * | 9/2015 | Gimpel | E04B 1/994 |
| 9,466,283 | B2 * | 10/2016 | Yang | G10K 11/175 |
| 9,630,575 | B2 * | 4/2017 | Zhang | B60R 13/0212 |
| 10,099,317 | B2 * | 10/2018 | Hakuta | G10K 11/162 |

(Continued)

*Primary Examiner* — Forrest M Phillips
(74) *Attorney, Agent, or Firm* — H. Jay Spiegel

(57) ABSTRACT

A sound attenuating device includes an enclosure defining a chamber containing a conical passive radiator. The center of the cone is open and a plug is installed in the opening that facilitates adding weights there. Weight is added over the plug to modify the resonant frequency of the passive radiator to lower or raise the resonant frequency. In the method, a room is provided where it is desired to attenuate unwanted low frequencies. Sound waves are played in the room and its resonance frequency is determined. Once that occurs, weights are added to the center of the cone of the passive radiator correlating to the desired resonance frequency of the passive radiator. Then, the passive radiator is placed in the room, and sound waves are again played and measurement is made to confirm attenuation of low frequency sound waves.

13 Claims, 13 Drawing Sheets

(56) References Cited

U.S. PATENT DOCUMENTS

| | | | | |
|---|---|---|---|---|
| 11,021,870 | B1 * | 6/2021 | Mcknight | E04B 1/84 |
| 12,211,476 | B2 * | 1/2025 | Ishii | F16F 15/06 |
| 2016/0027427 | A1 * | 1/2016 | Yang | G10K 11/172<br>181/286 |

* cited by examiner

Room Mode Distribution

| Frequency [Hz] | nx | ny | nz | Type |
|---|---|---|---|---|
| 34.3 | 1 | 0 | 0 | Axial |
| 42.9 | 0 | 1 | 0 | Axial |
| 54.9 | 1 | 1 | 0 | Tangential |
| 57.2 | 0 | 0 | 1 | Axial |
| 66.7 | 1 | 0 | 1 | Tangential |
| 71.5 | 0 | 1 | 1 | Tangential |
| 79.3 | 1 | 1 | 1 | Oblique |

TUNABLE PASSIVE RADIATOR LOW FREQUENCY ABSORBER AND METHOD OF USE

BACKGROUND OF THE INVENTION

The present invention relates to a tunable passive radiator low frequency absorber and method of its use in the modal frequency range.

Critical listening environments are the final component in the sound reproduction from the loudspeaker to the listener's ear. This element is notably the most challenging aspect in optimizing the performance of a critical listening room where the loudspeaker's characteristics can be degraded, especially at low frequencies by the room's modal resonances.

Different room types impose unique acoustic requirements based on their intended use. Control rooms require a neutral acoustic environment to hear the music without the room's acoustical characteristics. Recording studios need controlled acoustics that balance liveliness with the correct mixture of diffusion and absorption. Home theaters require a balance between accuracy and enjoyment, while conference rooms prioritize speech intelligibility. This invention addresses a method to control room modes in any of these spaces.

Room modes and their characteristics are fundamentally determined by room geometry, with their perceptual impact governed by the complex interrelationship between source and listener positioning. Specifically, the source location determines which modal resonances are excited within the space, while the listener location determines which of these modes are perceived. The present invention addresses this acoustic challenge through the use of passive radiators designed to minimize each of the modal resonances in a given room.

A traditional approach to controlling the low-frequency room modes is to determine the optimal dimensional ratios using a solution to the wave equation for a cuboid room, which assumes all modes are excited and all modes are heard. Equation (1) determines the location of the modal frequencies, $f_i$, but not their relative energies, wherepnd-1 l, w, and h are the room's length, width, and height, n are integers representing the order of the mode in each direction, and cis the speed of sound.

$$f_i = \frac{c}{2}\sqrt{\left(\frac{n_x}{l}\right)^2 + \left(\frac{n_y}{w}\right)^2 + \left(\frac{n_z}{h}\right)^2} \tag{1}$$

The dimensional analysis of cuboid rooms forms the foundation of many low frequency optimization methodologies. Equation (1) reveals the frequencies of discrete room modes. When the room is non-cuboid a detailed FEM analysis is needed to identify the modal frequencies. In all situations, once the position of the room modes is identified, this invention can design passive radiators to minimize the modal interference.

A typical cone loudspeaker consists of a pliable surround, which isolates a cone, containing a loudspeaker voice coil, which drives the speaker cone (diaphragm) according to an electrical input to move the speaker creating sound. Instead of using a loudspeaker driver, we instead use what is called a passive radiator. The passive radiator consists of the surround and the diaphragm, without the voice coil. This novel approach allows the diaphragm to move like a piston i.e., each point on the diaphragm moves with the same velocity and phase. Using a passive radiator means that approximating the movement of the membrane to that of a piston will be more accurate and thus prediction models will be more useful when designing an absorber for a specific application. Applicants have found that adding a weight to the center of a passive radiator increases the moving mass of the membrane thus lowering its resonant frequency, potentially allowing shallower low frequency absorbers to be built than is the case with a Helmholtz resonator.

Applicants model the passive radiator as a pistonic oscillator with mass and stiffness controlled solely by its material and cavity properties. Pistonic oscillation or an approximation thereof can be achieved by utilizing a loudspeaker surround designed for such oscillation.

This means that the plate will oscillate with motion governed by these parameters such that its resonant frequency can be given by:

$$f = \frac{1}{2\pi\sqrt{\frac{m}{k}}}$$

where m is the mass and k is the stiffness of the surround. The pistonic case can be represented as shown.

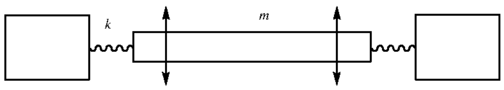

To determine the necessary weights needed to lower the resonant frequency of a given passive radiator, applicants experimentally determine the resonant frequency of the enclosure, with added porous absorption of a given flow resistivity, with the unweighted passive radiator attached. This is a calibration which allows the determination of the appropriate added weight to achieve a desired resonant frequency. A table of weights added to achieve a range of frequencies is created for each passive radiator.

A passive radiator (or "drone cone", the surround and cone assembly of a loudspeaker without a voice coil or magnet) is a dynamic diaphragm. It moves efficiently in response to air pressure changes inside an enclosure, typically driven by an active speaker, to create a boost in low frequency sound energy. In a sound absorbing context, applicants have found that the dynamic diaphragmatic movement can be tuned to resonate at specific low frequencies by adjusting the weight of a centrally located weight. The passive radiator, when properly damped can absorb a desired low frequency energy and so diminish problematic room modes.

Using a passive radiator as a low-frequency absorber is an unexplored concept in room acoustics. While passive radiators are traditionally used in speaker enclosures to enhance bass response, the present invention provides a method to adapt them for tunable low-frequency absorption in acoustic treatment.

The present invention provides a method for minimizing the low frequency acoustical distortion in a room by introducing a tunable low frequency passive radiator absorber at a wide range of possible low frequencies to minimize room modal resonances. The present invention has been found to help to create a neutral acoustic environment. In production spaces, such as recording studios, this neutrality ensures that audio content remains faithful to the original performance, allowing it to be transferable and accurately reproduced in other listening environments. In reproduction spaces, such as home cinemas or high-end listening rooms, it enables accurate reproduction of audio content as intended by the creators, free from coloration introduced by room acoustics.

The traditional approach to control low frequency modal resonances has been to use Helmholtz resonators or membrane absorbers. While this can be successful, Applicants have found that passive radiators can offer more flexibility, efficiency, and aesthetic appeal. Unlike active digitally controlled resonator/absorber technologies, the center of a passive radiator does not house a motor assembly (no coil or magnet typically covered by a dust cap). In place of that, a rigid base plate or plug is added in production to provide an attachment point for weights. To address different frequencies, weights can be added to achieve one of several designed frequency tunings. Weight can easily be added or removed to adjust the frequency. This approach offers a compact, tunable alternative to Helmholtz and membrane absorbers.

Once the modal resonances of the room are determined through experimental measurement or prediction in rectangular spaces, the specific added weights for each modal resonance can be calculated and a weight or weights for each passive radiator can be specified.

SUMMARY OF THE INVENTION

The present invention relates to a Tunable Passive Radiator Low Frequency Absorber and Its Method of Use and provides a method to determine the necessary weight to be added to a passive radiator of a given diameter and made of given materials, native moving mass, with a given stiffness and damping in an enclosure of a given depth and volume to absorb a particular modal resonance. The weight is simply added to the base plate installed during production.

The present invention includes the following interrelated objects, aspects, and features:

I. In a first aspect, a preferred embodiment of the present invention employs a sound attenuating device including an enclosure defining a chamber containing a conical passive radiator of given diameter and materials, native moving mass, with a given stiffness and damping in an enclosure of a given depth and volume which can absorb a particular modal resonance. The center of the cone is open and a plug is installed in the opening that facilitates adding weights there. The plug may be made of any suitable material such as metal, wood or plastic.

2. To address problematic resonances in a given room, a graph of weight vs. resonance frequency is created and is used to determine the appropriate weight that needs to be attached to the plug of the passive radiator for each problematic room resonance. In a preferred embodiment, a plurality of weights of known weight are attached to the plug. Once the desired modal resonance frequency is known, one or more of the weights can be removed if necessary to arrive at the desired modal resonance frequency. As described later, an impedance tube may be employed to determine the relationship between the resonance frequency and the weight added.

3. A room is chosen by a customer where it is desired to attenuate unwanted low frequencies. Its resonance frequency is determined and provided. Once that occurs, with reference to the weight vs. resonance frequency graph, weight is adjusted by adding or removing weights mounted on the plug correlating to the desired resonance frequency of the passive radiator.

4. To verify the effectiveness of the tuned passive radiators, the modal response of the room can be measured and compared with a measurement prior to application of the tuned resonators.

OBJECTS OF THE INVENTION

As such, it is a first object of the present invention to provide a tunable passive radiator low frequency absorber and its method of use.

It is a further object of the present invention to provide a method to design a passive radiator with a given diameter, native moving mass, with a given stiffness and damping in an enclosure of a given depth and volume to absorb a particular modal resonance.

It is a still further object of the present invention to ensure optimal low frequency performance in audio production spaces, such as recording studios, mixing, and mastering control rooms, and reproduction rooms, such as home cinemas and listening rooms.

It is a yet further object of the present invention to modify the resonant frequency of a passive radiator by adding a weight to a base plate to lower the resonant frequency.

It is a still further object of the present invention to determine correlation between weight added centrally of a passive radiator and resulting modal frequency damping for plural amounts of weight.

It is a yet further object of the present invention to design a series of passive radiators to minimize all of the modal resonances in a given room.

It is a yet further object of the present invention for an end user to place the passive radiators in a given listening room, test the room for problematic modal resonance frequencies, adjust the weights on a required number of passive radiators to attenuate that frequency and compare their effect in minimizing the modal resonances.

These and other objects, aspects, and features of the present invention will be better understood from the following detailed description of the preferred embodiments when read in conjunction with the appended drawing figures.

SPECIFIC DESCRIPTION OF THE PREFERRED EMBODIMENTS

Figure 1:
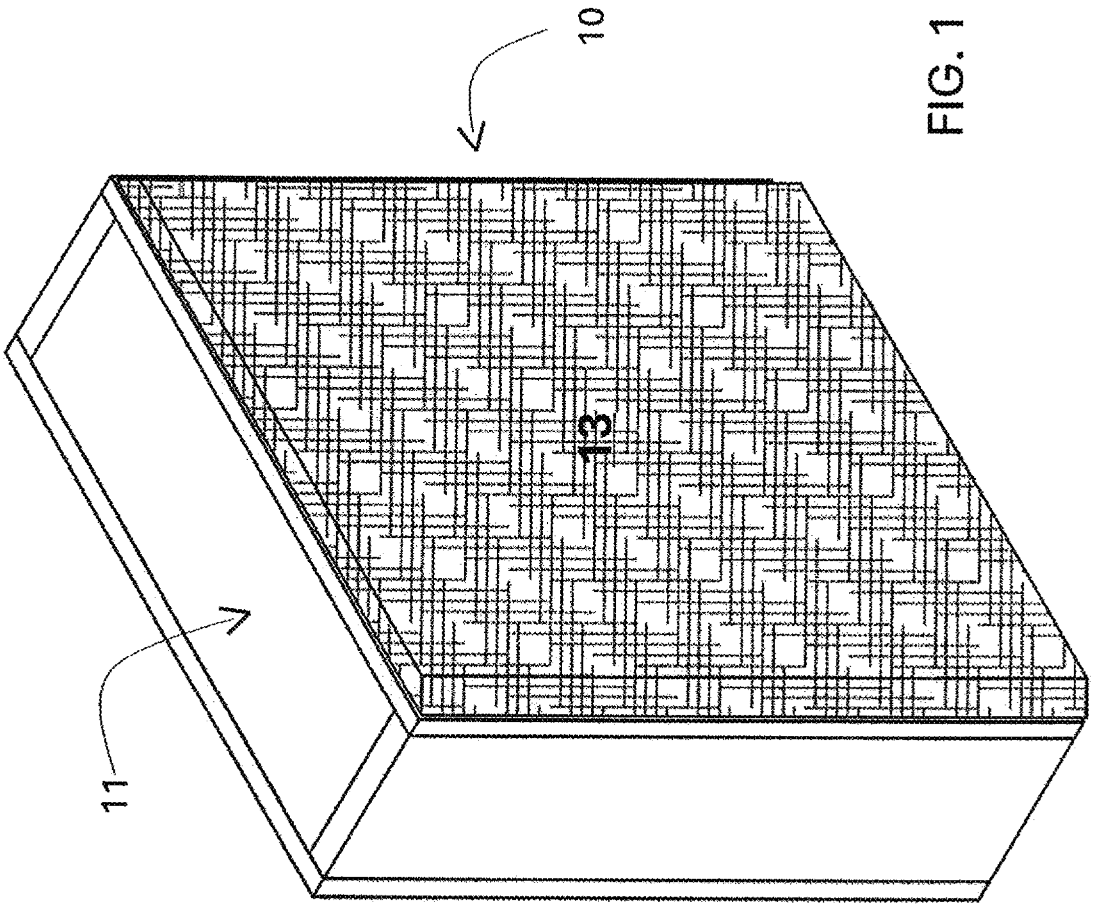
FIG. 1 shows a front perspective view of a first example of an enclosure for a passive radiator.
Figure 2:
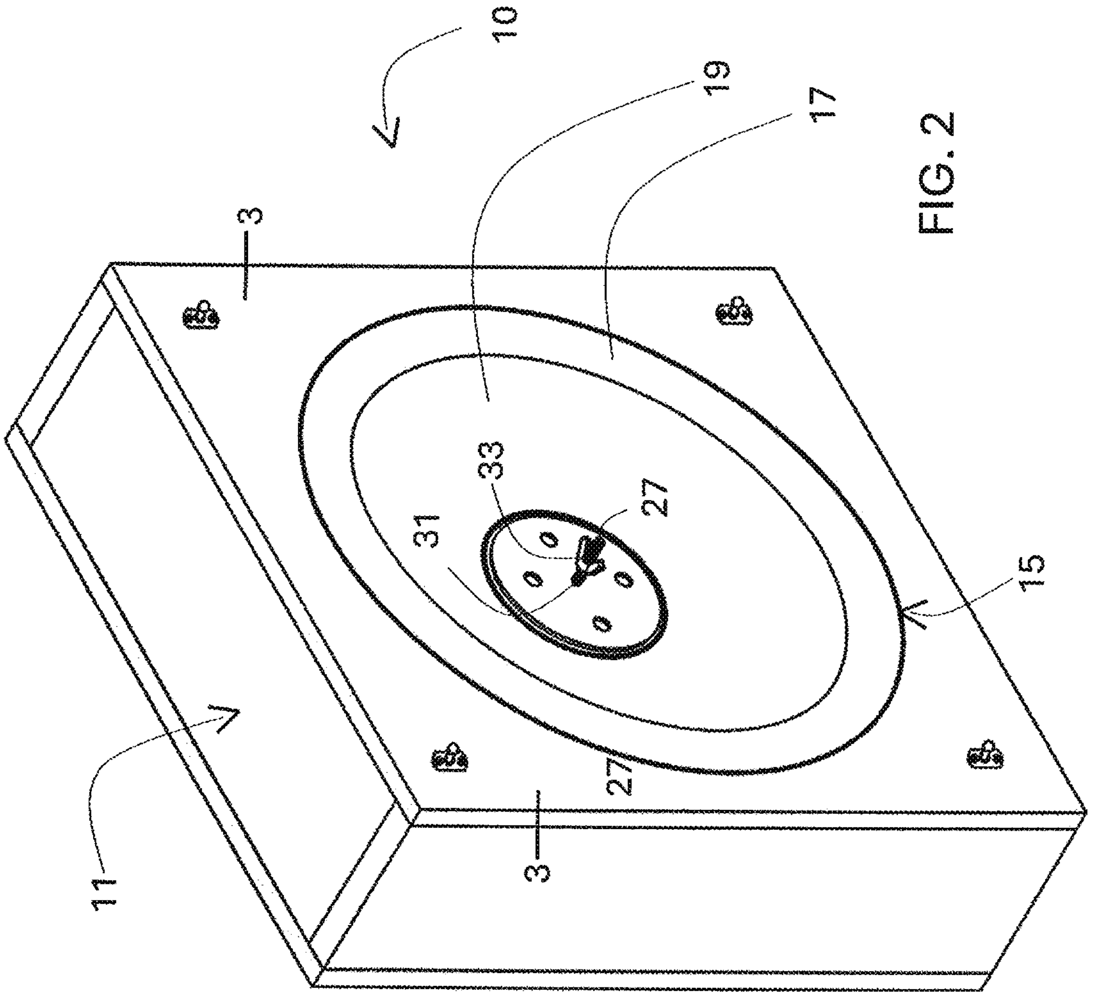
FIG. 2 shows a front perspective view of the first example with the front grille removed.
Figure 3:
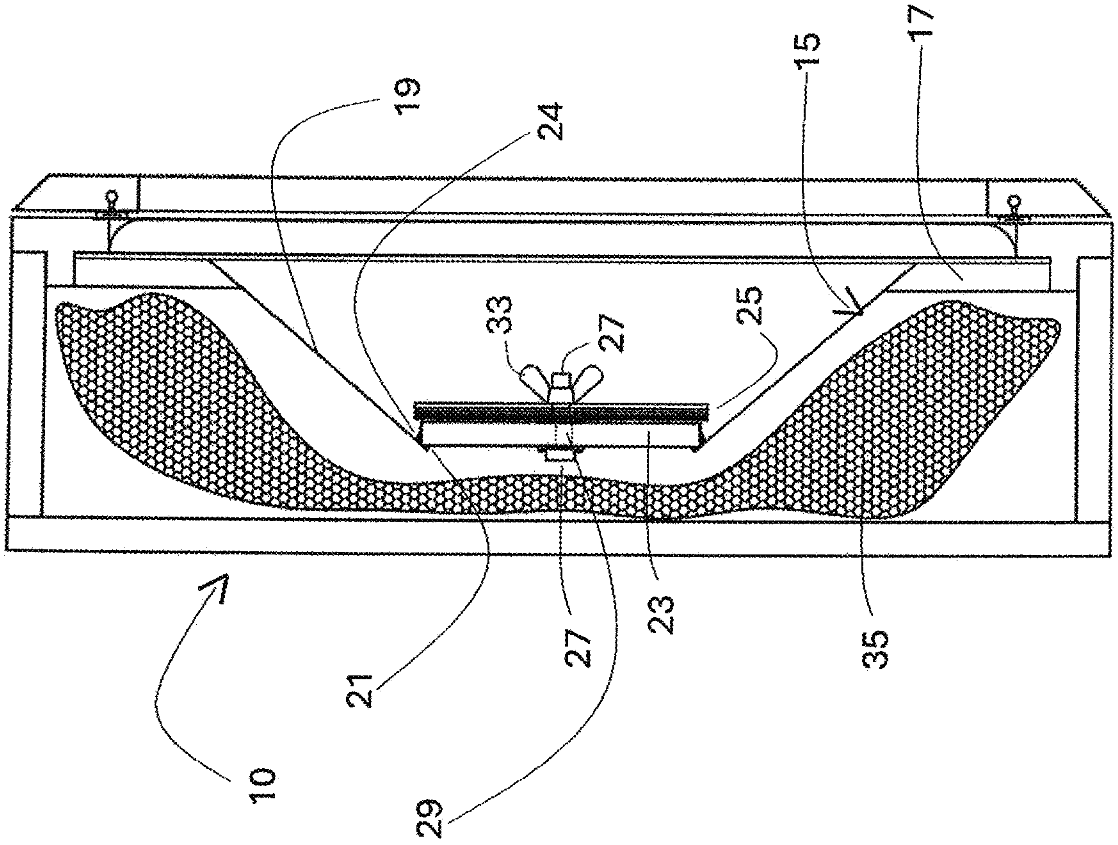
FIG. 3 shows a cross-sectional view along the line 3-3 of FIG. 2.

With reference first to FIGS. 1-3, a first example of a sound attenuating device is generally designated by the reference numeral 10 and is seen to include an outer generally rectangular cubic enclosure or housing 11 and a front grill 13.

With reference to FIG. 2, with the front grill 13 removed, a passive radiator 15 is seen to include a surround 17 and a cone 19. The cone 19, which is a diaphragm, has a central opening 21 (FIG. 3) in which plug 23 is provided which has an outer diameter slightly greater than the outer diameter of the opening 21. The plug is attached forward of the opening 21 by any suitable means such as adhesive 24. In the preferred embodiment, the plug 23 is ½" thick. A series of weights 25 are located on the forward side of the cone 19 above the plug 23 on the front side of the cone 19. A threaded bolt 27 extends through an opening 29 in the fitting 23 as well as an opening 31 (FIGS. 2 and 9) in each weight 25 and a wing nut 33 is threaded over the bolt 27 to hold the assembly together.

Figure 4:
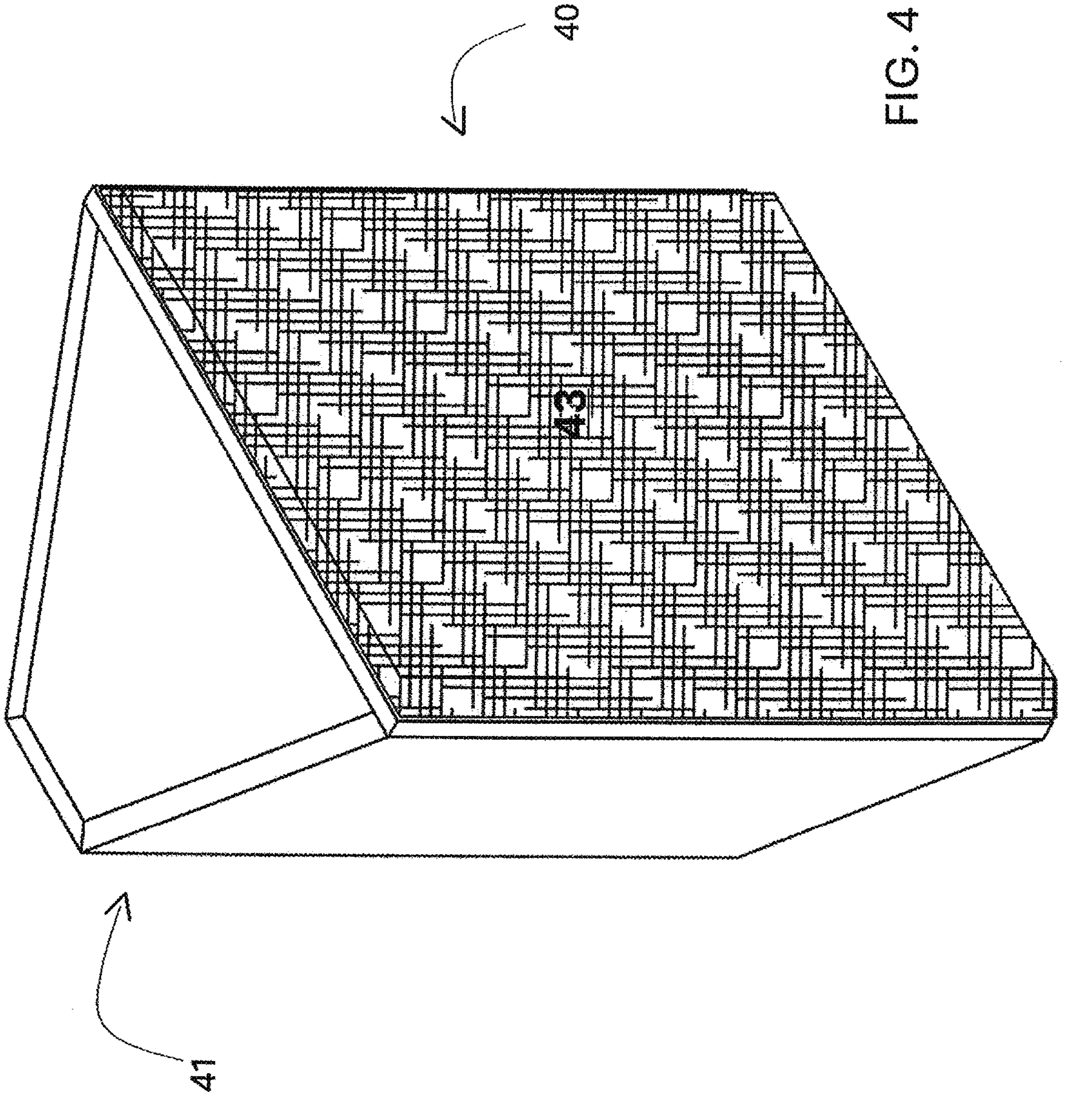
FIG. 4 shows a front perspective view of a second example of an enclosure for a passive radiator.
Figure 5:
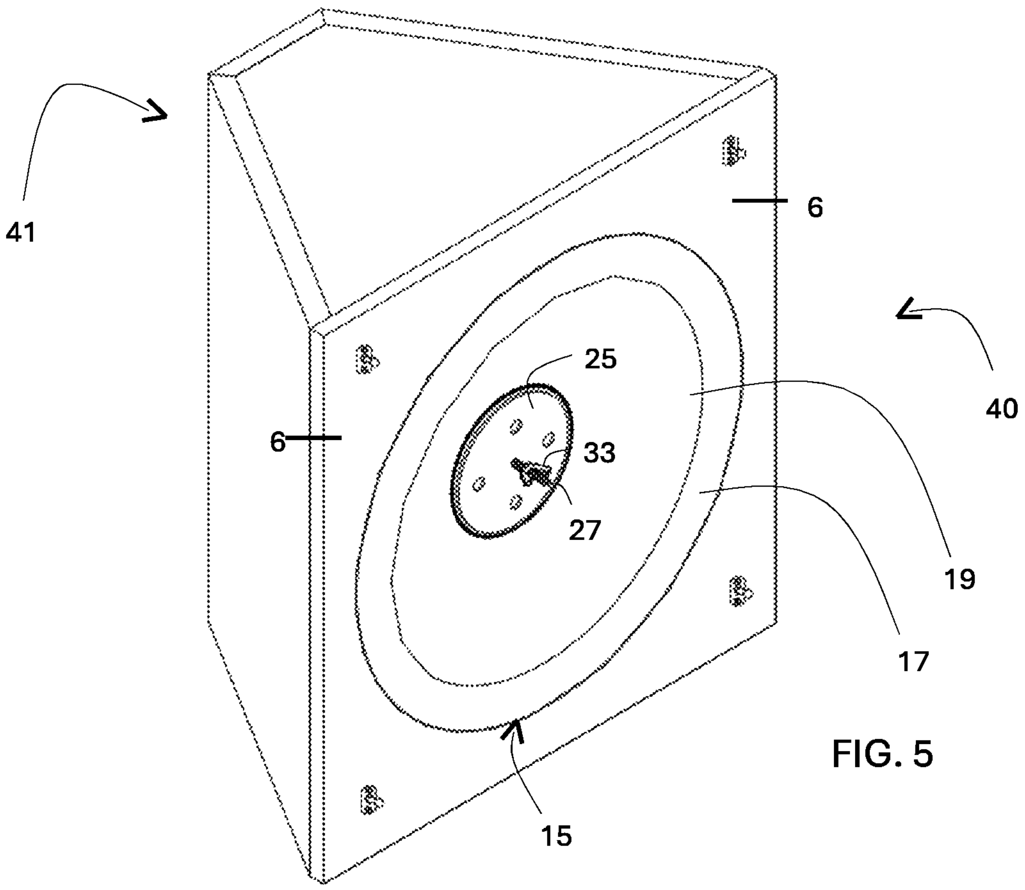
FIG. 5 shows a front perspective view of the second example with the front grille removed.
Figure 6:
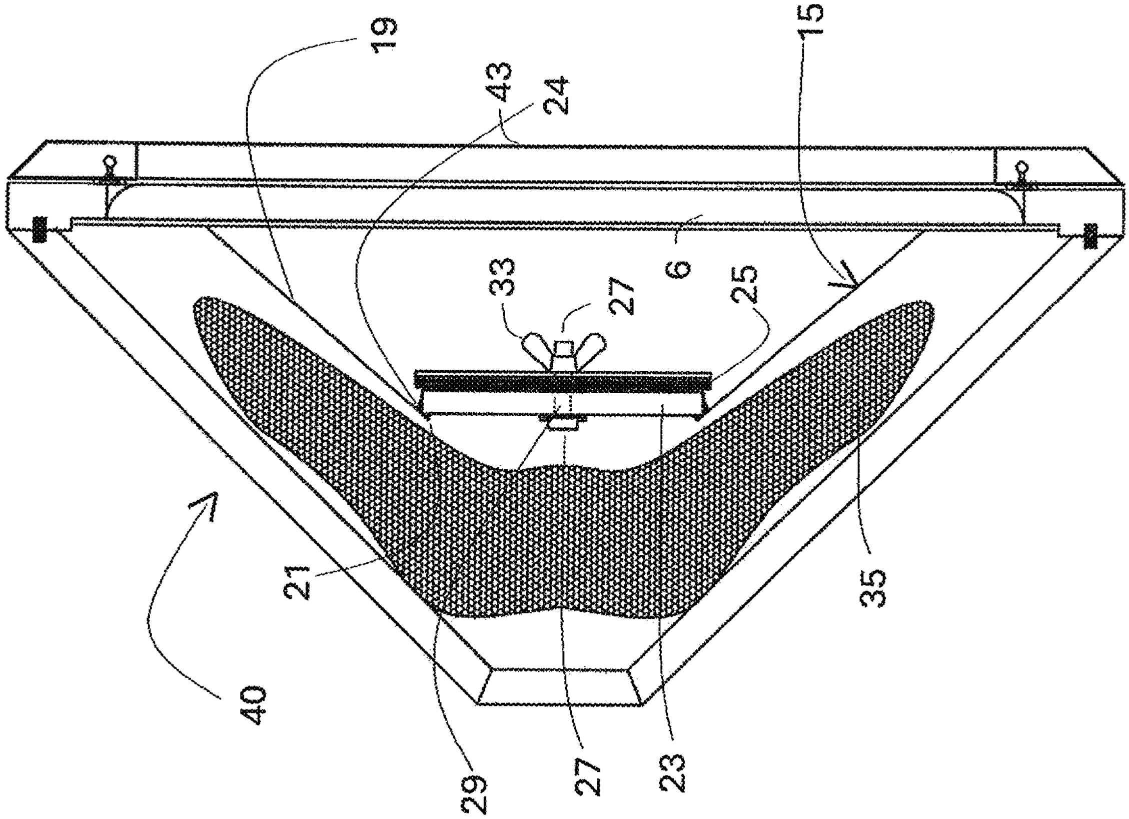
FIG. 6 shows a cross-sectional view along the line 6-6 of FIG. 5.

With reference to FIGS. 4-6, a second example of a sound attenuating device is generally designated by the reference numeral 40 and includes the enclosure or housing 41 and the grill 43. The enclosure or housing 41 is generally trapezoidal cubic in configuration. Within the enclosure or housing, in the example shown, the same components shown in the interior of the enclosure or housing 11 are shown here as well designated by the same reference numerals. It is noted that, with reference back to FIG. 3, a sound absorbing material 35 of any desired material is located behind the passive radiator 15 and the same is true in the example of FIGS. 4-6 as specifically seen in FIG. 6.

Figure 7:
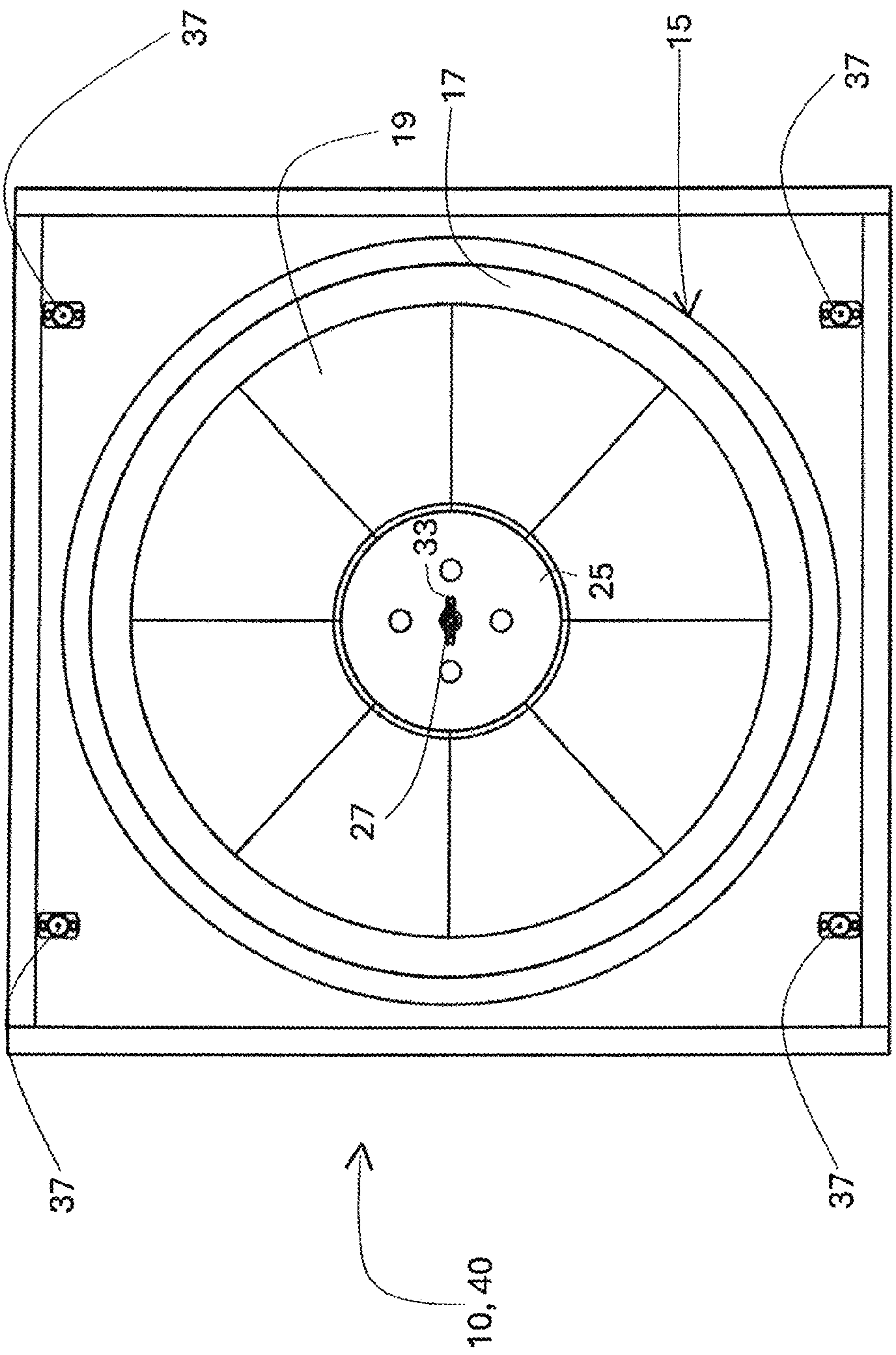
FIG. 7 shows a front view of the second example of an enclosure for a passive radiator.

FIG. 7 shows a front view which could be of either the example 10 or the example 40. It shows a front view of the passive radiator 15 with its resilient surround 17 and cone 19.

FIG. 7 also shows the front weight 23, the end of the threaded bolt 27, and the wing nut 33. Also noted are the attachment members 37 which are designed to hold the grill 13, 43, in place overlying the passive radiator 15.

Figure 8:
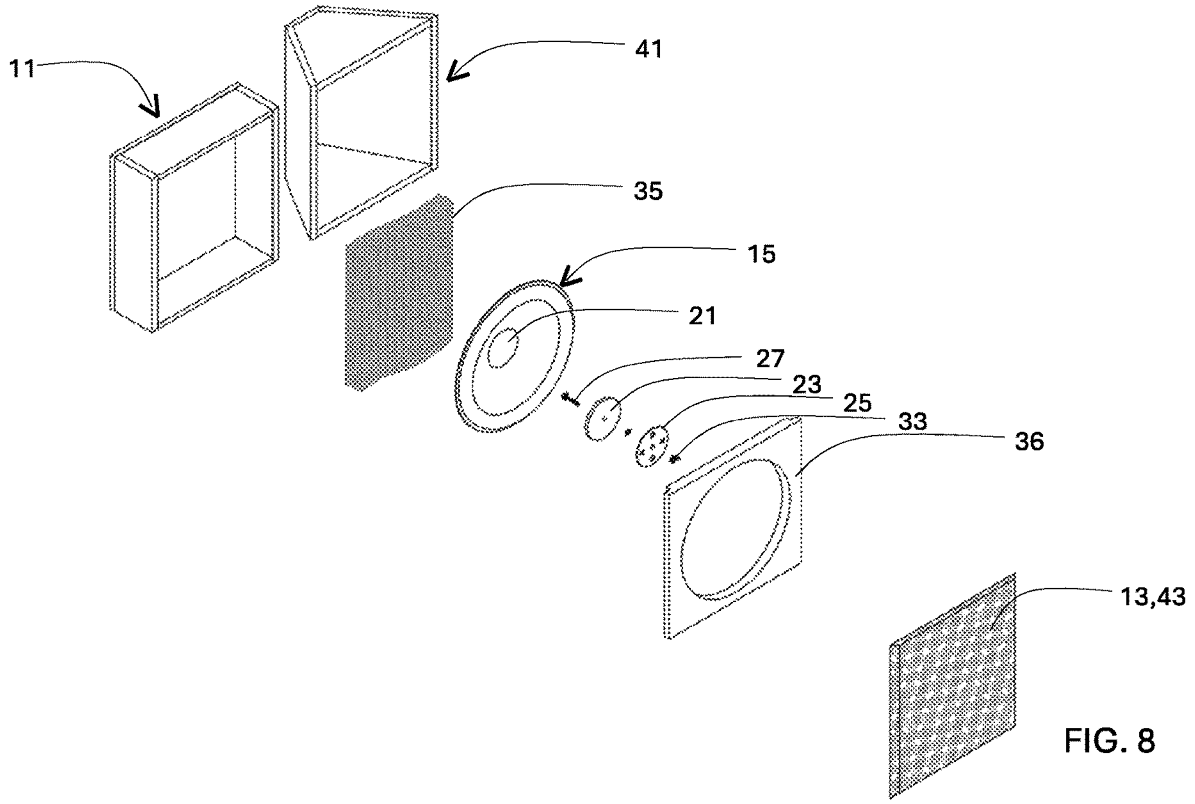
FIG. 8 shows an exploded perspective view explaining the assembly of the fitting holding a chosen weight in the center of a passive radiator.

FIG. 8 shows an exploded perspective view which is of either the example including the enclosure or housing 11 or the enclosure or housing 41. The sound absorbing material 35 is shown as well as the passive radiator 15 and a component 36 of the enclosure holding the passive radiator 15 in place, as well as the front grill 13 or 43.

The passive radiator includes the opening 21 and the plug 23 has a slightly larger diameter than that of the opening 21 so that it doesn't fall through the opening 21 in the view of FIG. 8 and allows clamping of the weight 25 using the bolt 27 and the wing nut 33. In the preferred embodiment, the plug 23 is cemented in place overlying the opening 21. Thus, it should now be clearly understood how the weights 25 are removably attached in the opening 21 of the passive radiator 25.

Figure 9:
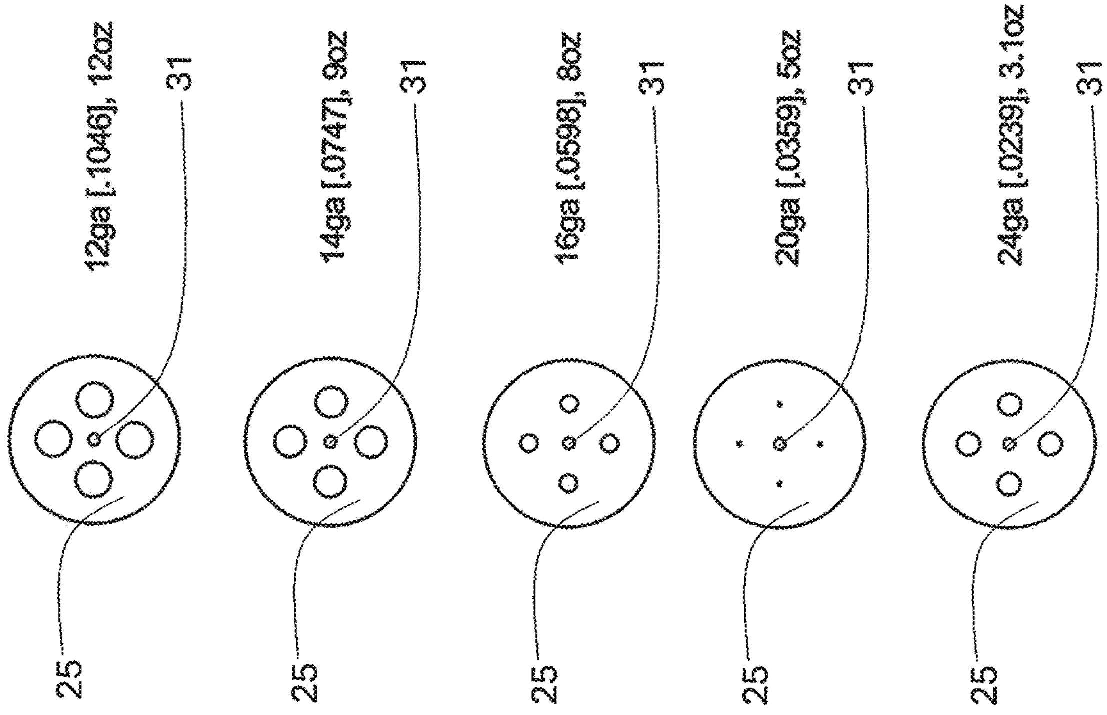
FIG. 9 shows a front view of examples of weights used in practicing the present invention.

With reference now to FIG. 9, five different weights are shown and are described as weighing 3.1, 5, 8, 9 or 12 ounces. Each one has the central opening 29 sized to receive the bolt 27. In the preferred embodiment, all of the weights 25 are initially installed over the plug 23 and one or more weights 25 are removed to tune the passive radiator to the desired modal resonance frequency.

Figure 10:
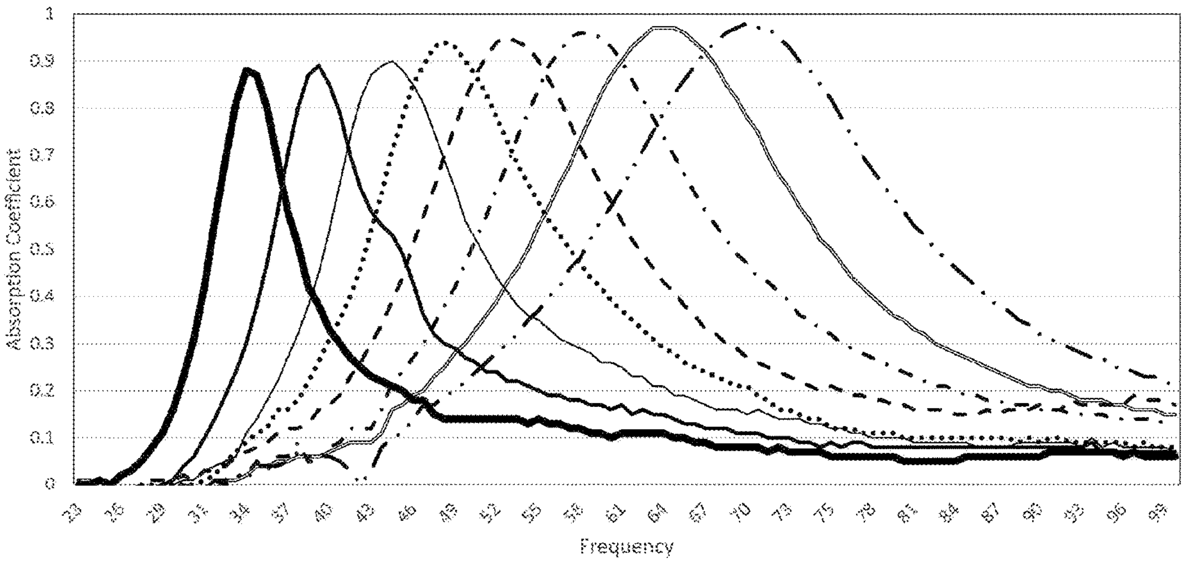
FIG. 10 shows a graph of Absorption Coefficient vs Frequency for numerous examples of measured modal frequencies.

With reference to FIG. 10, a graph is shown that depicts absorption coefficient versus frequency for eight different variations in the weight 25. As seen in FIG. 10, Applicants discovered that by varying the weight 25 attached to the plug 23, the modal frequency which the passive radiator attenuates is varied. As shown in FIG. 10, with the weights varying from lighter to heavier, as the weight increases, the modal frequency attenuated goes down. This is also explained with reference to the graph of FIG. 11 which shows weight versus frequency to tune the passive radiator. The weight varies from 5 to 40 ounces and the frequency varies from 70 Hz to 35 Hz. A 7 ton, 25' long impedance tube with a 24"×24" cross-section was used to measure the resonant frequency of the unweighted passive radiator attached to a wooden enclosure of a given depth and containing a porous material of a given flow resistivity behind the passive radiator. This acted as a baseline measurement. Determining this 70 Hz resonant frequency, we predicted the various weights needed to achieve resonances at 35 Hz, 40 Hz, 45 Hz, 50 Hz, 55 Hz, 60 Hz, and 65 Hz, shown in FIG. 10. We then fit a line to these weights versus resonances to determine the plot in FIG. 11.

Figure 12:
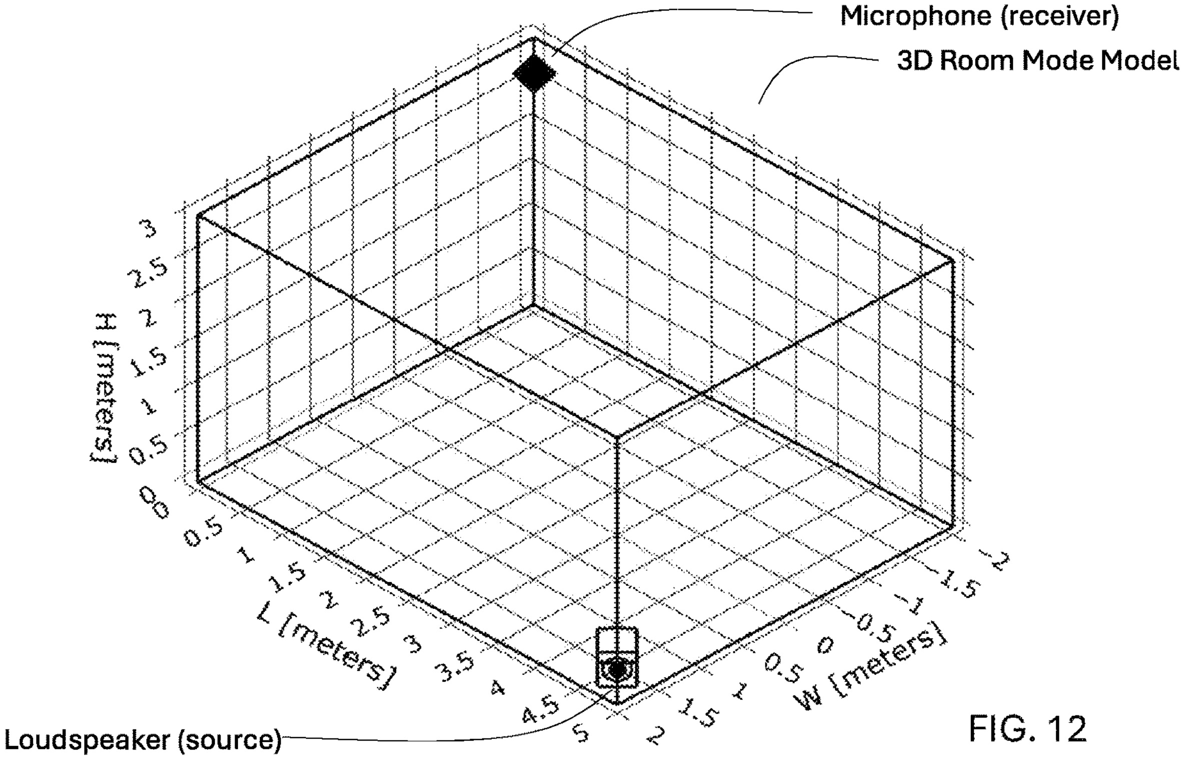
FIG. 12 shows an example of a rectangular cubic room showing a preferred location of a passive radiator.

FIG. 12 shows a room 60 with a passive radiator, for example, 10, located in a corner of the room 60.

Figure 13:
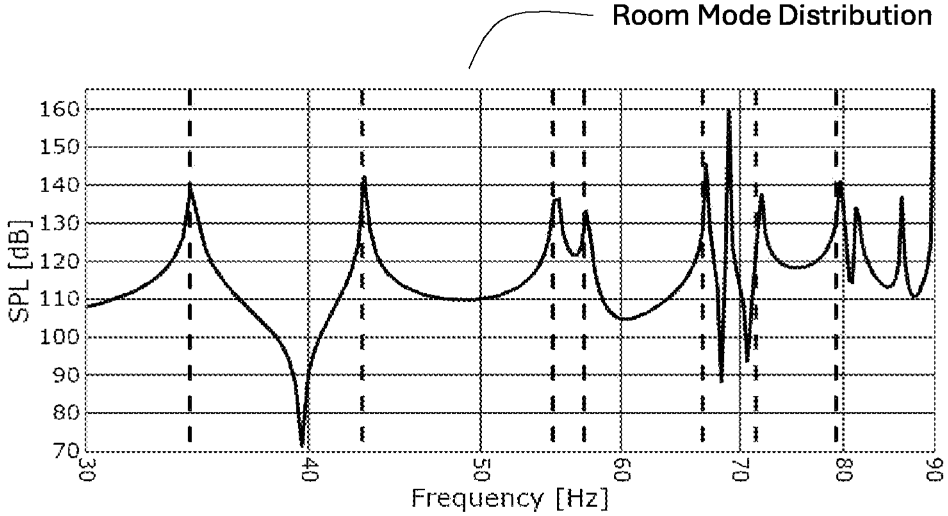
FIG. 13 shows a graph of SPL vs Frequency.

FIG. 13 shows a graph of sound pressure level (SPL) in decibels versus frequency in an untreated room with a table explaining the graph.

With the details of the sound attenuating devices 10, 40 having now been explained, the method of use of the passive radiators in the context of the present invention will now be explained.

Figure 11:
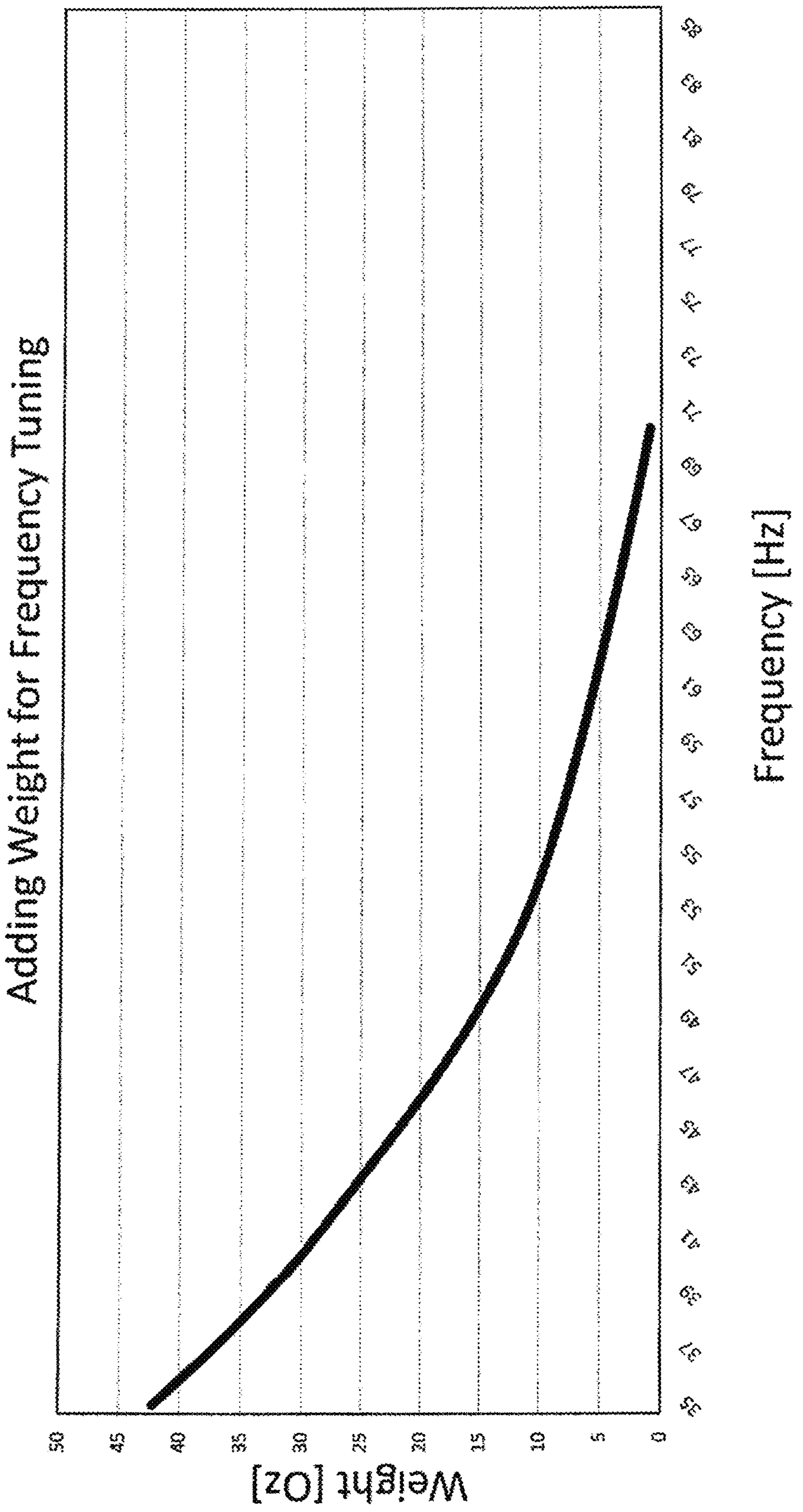
FIG. 11 shows a graph of Weight vs Frequency for a passive radiator example.

In a first aspect of the inventive method, an end user must predict or measure the modal response of the room to determine the modal resonances that need to be attenuated and choose an appropriate passive radiator, reference numeral 10 or 40. The modal resonances are supplied to the manufacturer and FIG. 11 is used to determine the appropriate weights needed to attenuate each problematic resonant frequency. These weights are supplied along with the chosen passive radiators and shipped to the end user. The end user attaches the various weights to the wooden plug 15 of the passive radiators and places them in the available corners of the room and re-measures the modal response. Comparison with the untreated room reveals the effectiveness of the treatment.

It is noted that passive radiators are made of numerous materials. Table 1 set forth on the following pages in this application provides an extensive list of the possible materials that may be utilized in manufacturing the cone of the passive radiator. However, it is noted that whichever material is chosen is irrelevant to the present invention because whichever passive radiator is chosen, it is tested to prepare a graph such as that which is set forth in FIG. 11 by sequentially adding differing weights to the passive radiator and testing the resultant modal resonance.

Once the graph of weight versus frequency has been created, the next step is to determine the customer's desired listening room which may be of any dimensions including rectangular cubic or irregular. The customer will have tested the room to determine the low frequency modal resonances and will provide that information. This may be accomplished by the customer playing a varying frequency sound in the room and seeing where the spikes in the graph of what occurs in the room are located as to their frequency. Once the low frequency modal resonance has been provided for the room, the passive radiator is adjusted by installing the correct weight so that the modal resonance of the passive radiator matches the modal resonance of the room.

Once the passive radiator has been appropriately adjusted, the sound attenuating device is located in a corner of the room and the testing is conducted to see if the existence of the passive radiator has reduced the low frequency modal resonance in the room. Applicants submit that this will certainly occur and the modal resonance in the room will be significantly reduced thereby enhancing the listening experience.

TABLE 1

| WOOFER CONE MATERIALS |
| --- |
| **Paper & Fiber-Based (classic + still very popular)** |
| Paper (pulp) |
| Treated paper (coatings, resins, lacquers) |
| Wood pulp blends |
| Bamboo fiber |
| Hemp fiber |
| Cotton fiber |
| Kapok fiber |
| Banana fiber |
| Kenaf fiber |
| Recycled paper/fiber composites |
| **Synthetic Fabrics & Polymers** |
| Polypropylene (PP) |
| Thermoplastic polymers |
| Polyethylene |
| Mylar (PET) |
| TPU (thermoplastic polyurethane) |
| Polycarbonate |
| ABS plastic |
| Acrylic polymers |
| **Woven/Composite Fabrics** |
| Kevlar |
| Aramid fiber |
| Fiberglass |
| Carbon fiber |
| Carbon fiber-paper hybrids |
| Carbon fiber-foam sandwich |
| Glass fiber-paper composites |
| Nomex honeycomb cores |
| Rohacell foam cores |
| **Metals (rigid and revealing)** |
| Aluminum |
| Aluminum-magnesium alloy |
| Magnesium |
| Titanium |
| Beryllium (rare in woofers, more tweeters) |
| Stainless steel (very rare) |
| Metal-ceramic composites |
| **Exotic/Advanced Materials** |
| Ceramic |
| Alumina ceramic |
| Graphene-coated cones |
| Graphene composites |
| Carbon nanotube composites |
| Aerogel composites |
| Basalt fiber |
| Mineral-filled polymers |
| Metal-matrix composites |
| **Foam & Sandwich Structures** |
| Polymer foam cones |
| Structural foam cores |
| Paper-foam-paper sandwiches |
| Carbon-foam-carbon sandwiches |

The present invention may be applied by using a single passive radiator or multiple passive radiators tuned to the same low frequency modal resonance. Passive radiators may be employed of any desired diameter and/or cone area. The trick is to first determine the frequency at which the passive radiator attenuates a modal resonance for each weight added in the central opening of the cone of the passive radiator and then determine the low frequency modal resonance in the room and match the modal resonance of the passive radiator to the modal resonance in the room.

In this way, the modal resonance in the room can be significantly reduced and the listening experience can be significantly enhanced.

As such, an invention has been disclosed in terms of apparatus and the method for its practice that provides a new and useful tunable passive radiator low frequency absorber and method of use of great novelty and utility.

Of course, various changes, modifications and alterations in the teachings of the present invention may be contemplated by those skilled in the art without departing from the intended spirit and scope thereof.

As such, the present invention is only intended to be limited by the terms of the appended claims.

The invention claimed is:

1. A sound attenuating device, comprising:

a) a housing creating an internal chamber;

b) a diaphragm comprising a conical passive radiator and mounted on said device with a rear surface facing said chamber and a front surface facing away from said chamber and defining at least in part a front wall of said housing;

c) a central opening formed through said passive radiator; and d) a weight attached to a plate extending over said opening;

e) said housing devoid of any sound producing components, said conical passive radiator vibrating to absorb sound;

f) said passive radiator comprising a resonator attenuating a modal resonance of sounds entering said internal chamber at a frequency correlated to a weight of said weight.

2. The sound attenuating device of claim 1, wherein said conical passive radiator has a periphery connected to said housing via a flexible surround.

3. The sound attenuating device of claim 1, wherein said weight is attached over said opening with said plate behind said weight attached to said passive radiator and coupled to said weight which is located forward of said opening.

4. The sound attenuating device of claim 1, wherein said housing is rectangular cubic.

5. The sound attenuating device of claim 1, wherein said housing is trapezoidal.

6. The sound attenuating device of claim 3, further including a threaded bolt extending through aligned openings in said plate and weight and a nut threaded over an end of said bolt.

7. The sound attenuating device of claim 6, wherein said nut is a wing nut.

8. The sound attenuating device of claim 1, further including a sound absorbing material located within said chamber behind said diaphragm.

9. A method of attenuating low frequency modal resonances in a room in which low frequency modal resonances are known, including the steps of:

a) choosing a sound attenuating device including a housing creating an internal chamber comprising a conical passive radiator comprising a diaphragm with a central opening therethrough, said conical passive radiator defining at least in part a front wall of said housing;

b) testing said passive radiator by attaching a sequence of weights within a range of 5 to 40 ounces over said opening and for each weight, determining a modal resonance frequency within a range of 35 to 70 Hz attenuated by said passive radiator, said attaching step comprising providing a plate extending over said opening to which said weights are attached;

c) attaching a weight or weights to said opening in said diaphragm which correlate modal resonance frequency of said room to modal resonance frequency attenuated by said passive radiator; and d) placing said sound attenuating device within a said room to attenuate said modal resonance frequency of said room.

10. The method of claim 9, wherein said sequence of weights are removably attachable to said plate.

11. The method of claim 9, wherein said room is generally rectangular cubic.

12. The method of claim 9, wherein said room has an irregular shape.

13. The method of claim 9, wherein said sound attenuating device is located in a corner of said room.

* * * * *